June 9, 1964 R. J. HACKMAN 3,136,060
DEVICE ISOPACHOMETER
Filed March 6, 1961 3 Sheets-Sheet 1

INVENTOR
Robert J. Hackman
BY
ATTORNEY

June 9, 1964  R. J. HACKMAN  3,136,060
DEVICE ISOPACHOMETER

Filed March 6, 1961  3 Sheets-Sheet 2

INVENTOR
Robert J. Hackman
BY Ernest Cohen
Gersten Sadowsky
ATTORNEY

June 9, 1964   R. J. HACKMAN   3,136,060
DEVICE ISOPACHOMETER

Filed March 6, 1961   3 Sheets-Sheet 3

INVENTOR
Robert J. Hackman
BY *Emmett S. Cohen*
*Gersten Sadowsky*
ATTORNEY

United States Patent Office 3,136,060
Patented June 9, 1964

3,136,060
DEVICE ISOPACHOMETER
Robert J. Hackman, Falls Church, Va., assignor to the United States of America as represented by the Secretary of the Interior
Filed Mar. 6, 1961, Ser. No. 93,813
5 Claims. (Cl. 33—1)
(Granted under Title 35, U.S. Code (1952), sec. 266)

The invention herein described and claimed may be manufactured and used by or for the Government of the United States of America for governmental purposes without the payment of royalties thereon or therefor.

The present invention relates to an isopachometer and constitutes improvements in stereoscopic instruments having utility as a means for measuring vertical representations on photographs as seen through a stereoscopic viewer. Designs for instruments of this nature are based on parallax effects, the principles of which are well known in the art of stereoscopy. A full disclosure of such principles may be found in the Geological Survey Bulletin 1043–C, entitled Determination of Quantitative Geologic Data With Stereometer Type Instruments, by William R. Hemphill, published by the U.S. Government Printing Office, Washington 25, D.C., in 1958.

Descriptions of stereoscopic instruments for analyzing the stereoscopic model or the impression of three dimensions received when viewing a stereoscopic pair of photographs beneath a stereoscope, may be found in the Geological Survey Bulletin 1043–A, entitled Photogeologic Procedures in Geologic Interpretation and Mapping, by Richard G. Ray, published by the U.S. Government Printing Office, Washington 25, D.C., in 1956. Additional descriptions are to be found in U.S. Patent No. 2,104,778 to Talley, issued January 11, 1938, and in the U.S. Patent No. 2,871,563, to Sawyer et al. issued February 3, 1959. In the earlier patent to Talley, each of two separated transparent disks is marked with a circular indicium which may be seen stereoscopically as a floating mark. This mark is made to appear to rise or fall by means of adjusting the spacing between the disks. To determine the elevation of a point on a stereoscopic model of a terrain derived from a pair of aerial photographs, an adjustment is made to locate the floating mark at a datum or ground level, and from that setting a second adjustment is made to raise or lower the floating mark to the point being measured. Therefore, in the practice of this prior art invention a number of adjustments and readings are required to identify the elevation of any one or more points on a terrain being viewed as a stereoscopic image.

The later patent to Sawyer et al. discloses a similar operation for an apparatus wherein a stereoscopic view of the markings on two separated disks makes apparent a floating line instead of a circular indicium. In addition, this later invention provides means for separately adjusting each disk for rotation in its supporting frame. By making a number of these rotation adjustments and noting the related values read from a scale, the apparatus of this prior art provides data for use in formulas for deriving the slope and gradient values for the terrain being studied.

The improvements of the present invention facilitate a more convenient and simplified operation for an instrument measuring elevation on a stereoscopic model. In addition, the invention permits a more accurate determination of elevation for a plurality of points as seen on the model, wherein only a single adjustment of the instrument is necessary. Two separated disks in the nature of that disclosed in the Sawyer et al. patent, are used, each disk having a line of equally spaced dots passing through the center point thereof. However, in the improved instrument of this invention, the two marked disks are rotated simultaneously by a single adjusting means, to be moved equal amounts in opposite directions. As a result of this unique structural arrangement and cooperation, a stereoscopic view of the markings on the disks make evident a ladder of floating dots each corresponding to a different elevation.

An object of the present invention is to provide an easily operated instrument for accurately measuring the elevation of points on a stereoscopic model.

A further object of the present invention is to provide a stereoscopic instrument for rapidly measuring differences in elevation of points on a stereoscopic model derived from two aerial photographs of terrain as viewed through a stereoscopic apparatus.

Additional objects and advantages of this invention will become evident from a more complete understanding thereof by reference to the accompanying drawings in which.

Figure 1:
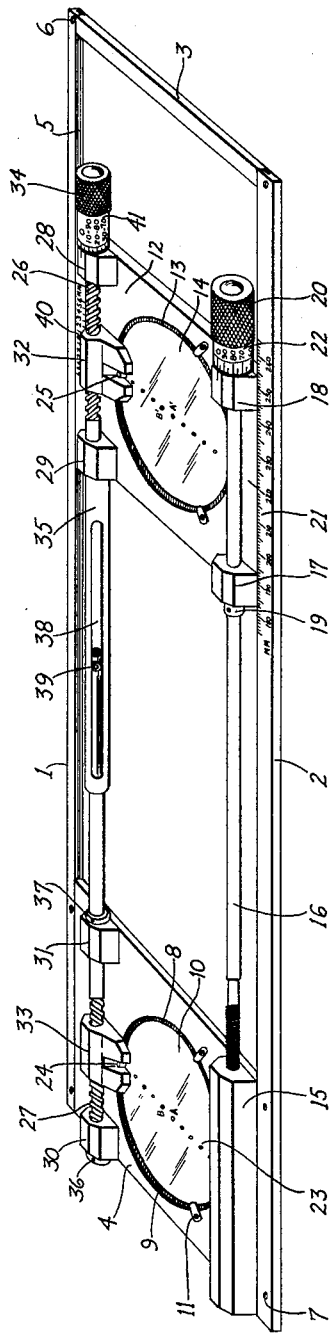
FIG. 1 is a diagrammatic view of the complete isopachometer illustrating the structural arrangement of all its pertinent parts.

Referring to the drawings there is shown in FIG. 1, an assembly of parts constituting the isopachometer. All the moving parts of this instrument are located within a rectangular metal frame comprising an upper bar 1, a lower bar 2, a side bar 3, and a plate 4. Into the inner sides of bars 1 and 2, are cut track-like grooves such as shown at 5. These grooves receive tongue extensions from bar 3, and plate 4 to form connections secured by screws such as shown at 6 and 7, to complete a metal frame of required rigidity.

Plate 4 is essentially a frame with a relatively large circular opening 8, having around its inner edge a stepped cut-out portion forming a narrow flange 9, of about one-half the thickness of the plate. Into the circular opening 8 is slidably fitted a transparent disk 10 of clear plastic or like material. Support for the disk 10 is provided by a narrow flange forming its periphery which is shaped to complement and overlie the flange 9 of the circular opening. Cleats such as shown at 11, pivotally connected to plate 4, maintain disk 10 in place within the opening 8.

A second plate 12, of substantially the same size and form as that of plate 4, contains within its opening 13, a second transparent disk 14. Here, as on the first plate, overlying flanges on plate 12 and disk 14, and pivotable cleats on the plate, support and maintain disk 14 in position on plate 12. Tenon-like rails extending from the top and bottom edges of plate 12, support it by riding in track grooves 5 between bar 3 and plate 4, for movement parallel to the long axis of the rectangular frame. On plate 4, and adjacent its lower edge, is secured an elongated block 15. A longitudinally drilled and threaded hole in block 15, engages within it the screw threads cut along nearly half the length of a rod-like shaft 16. Secured on and adjacent to the lower end of plate 12, at opposite corners thereof, in line with block 15, are relatively shorter blocks 17 and 18. Holes drilled through the respective blocks in line with the hole in block 15, form bearing supports for the unthreaded end of shaft 16. The relative position of plate 12 to the shaft 16 is fixed by a collar 19 fastened to the shaft by a set screw, and contacting an outer face of block 17, and by a knurled adjusting knob 20, also fastened to the shaft and contacting the outer face of block 18. By means of the pressure contact exerted by either collar 19, or knob 20, upon the bearing block coacting therewith, plate 12 may be moved towards or away from plate 4 by turning adjusting knob 20 to screw shaft 16 into or out of block 15. An index mark on plate 12 movable across a scale 21 graduated in millimeters inscribed on bar 2, and a drum scale 22 graduated to the nearest 0.01 millimeter inscribed on knob 20, indicate the separation between the two plates.

Each of the transparent disks 10 and 14, is marked on its underside by inscriptions of nine dots 23, arranged in a straight line so as to pass through the center of the respective disk, each dot being 0.2 millimeter in diameter, and six millimeters apart. The dots are alternately colored red and black with a middle red dot coincident with the center of the disk. Metal drive pins 24 and 25 project from disks 10 and 14, respectively, in line with the row of dots and six millimeters beyond the upper far dot of the row. Since the disks are easily moved from their plates by merely moving aside the cleats 11, substitute disks of the same construction as disks 10 and 14, but bearing other inscriptions, may be conveniently inserted and secured within the plates for rotation. For example, the inscriptions on each disk may consist of only the center dot and one other dot at a predetermined spacing therefrom, as shown on the disks of FIG. 2.

Disks 10 and 14 are driven to rotate on their supporting plates in opposite directions by an integral arrangement coacting with pins 24 and 25. This arrangement includes a pair of shafts 26 and 27, supported for rotation in bearing blocks 28 and 29 on plate 12, and bearing blocks 30 and 31 on plate 4, respectively. Along a major portion of that part of shaft 26 between its supporting blocks, there is cut a square thread having directed coarse pitch. A disk drive block 32, provided with a longitudinally drilled and threaded hole therethrough is centrally mounted thereby on the threaded portion of shaft 26 to ride thereon in either direction in accordance with the shaft rotation. Extending from the block is a furcated portion having two extending finger elements engaging between them the disk drive pin 25. A similar disk drive block 33, having its extending finger elements engaging drive pin 24, is centrally mounted on a threaded portion of shaft 27. However, the coarse pitch square thread cut on shaft 27, is in a reverse direction such that upon any rotation of shafts 26 and 27 in the same direction, blocks 32 and 33 will have longitudinal movement in opposite directions, and disks 10 and 14 will rotate in opposite directions.

A knurled adjusting knob 34, and a long slotted sleeve 35 secured by a set screw to turn with shaft 26, are fixed in position on the shaft to contact the outer faces on blocks 28 and 29, respectively, to prevent longitudinal movement of the shaft relative to the plate 12. Similarly collars 36 and 37, fixedly secured by set screws to turn with shaft 27, are in position thereon to contact with the outer faces of blocks 30 and 31, respectively, to prevent longitudinal movement of shaft 27 relative to plate 4. In addition, shaft 27 extends beyond collar 37 to enter about midway into sleeve 35, and effect a sliding fit therewith. The sleeve 35 is provided with a long narrow slot 38 which receives for sliding movement therein a pin-like element 39, extending at a right angle near the end of the extended portion of shaft 27.

As is now evident from an understanding of FIG. 1, the rotation of shaft 16, to move plate 12, relative to fixed plate 4, will merely cause pin 39 to slide within slot 38, without disturbing the rotative positions of shafts 26 and 27. Moreover, an adjustment of knob 34 will merely rotate drive shaft 26 and sleeve 35 whereby the side surfaces defining slot 38 will contact pin 39, and drive it and shaft 27, without disturbing the rotative position of shaft 16. Also evident is that rotation of the adjustment knob 34 will cause blocks 32 and 33 to simultaneously ride upon their respective threaded shafts, equal distances in opposite directions to rotate their corresponding disks 14 and 10, equal amounts in opposite directions. An indicator tick mark on the back of the disk drive block 32 moves across a scale 40 graduated in millimeters, and a drum scale 41 on the knob 34, graduated in .01 millimeter, moves past a mark on top of bearing block 28, to indicate the change in the parallax scale, as will be hereinafter more fully explained.

The isopachometer finds utility as part of a conventional arrangement of a stereoscope set-up to view a stereoscopic pair, or two photographs of the same area taken from different camera stations so as to afford stereoscopic vision. To be properly oriented, the stereoscopic pair is set under the stereoscope viewing lenses such that the photographs are aligned along the flight lines. This requires an alignment of the principal points (that is, the point of intersection of two straight lines each connecting opposite fiducial marks on the photograph, and which is usually near the center of the photograph), and the transferred principal points (the principal point of one photograph as located or spotted on the other or adjacent photograph). The photographs are arranged on a surface such that a straight line through all four of said points, is parallel to and directly beneath the stereoscopic axis (a horizontal line through the centers of the eye lenses of the stereoscope). Thereafter, with care being taken to separate the photographs for comfortable viewing, they are taped to the flat surface.

Figure 2:
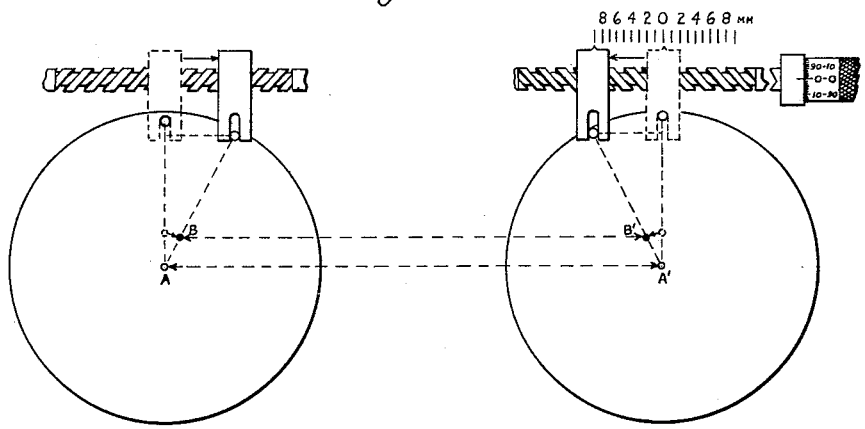
FIGS. 2 and 3 are schematic diagrams in which are illustrated working principles of the isopachometer.

Upon the stereoscopic pair is placed the isopachometer whereby its transparent disks 10 and 14 cover the area of the photograph being studied. With reference to FIG. 2, the distance shown between disk center dots A and A' is set by adjusting knob 20, to cause them to be fused stereoscopically into a single dot that appears to float in space. As understood in this art, and explained in the cited U.S. Government Printing Office publications, the apparent height of the point defined by the single fused dot, is related to the horizontal separation of the individual dots being viewed. The settings to be read on scale 21 and 22, indicate to the nearest .01 millimeter, the amount of separation, and the relationship thereof to elevation in feet may be determined by calculations fully explained in the cited Geological Bulletin No. 1043-C, on pages 39 to 45.

When the separation between disk markings B and B' is equal to the separation between center dots A and A', as shown in FIG. 1, points A and B will be seen through the stereoscope eye lenses as being at the same apparent height. Operation of parallax adjustment knob 34 to rotate the disks to diminsh the separation between dots B and B', as shown in FIG. 2, will cause point B to be seen at an apparent height above that of point A. The settings to be read on scales 40 and 41, is indicative of the difference in elevation between points A and B. This difference may be derived from the separation value read, in terms of elevation in feet in the manner to which reference was previously made. It should be noted that the isopachometer is constructed so that any movement of a disk drive pin 24 or 25, in the longitudinal direction parallel to the long axis of the main frame, is proportional to the movement of its respective off-center dot in the same direction at a ratio of 5 to 1. For example, if the right disk drive pin 25 and the disk drive block 32 with the indicator tick are moved 2.5 millimeters, the dot B' on disk 14, moves 0.5 millimeter. Since both disks rotate simultaneously, the total change in the separation of the dots B and B' is 1 millimeter. Scales 40 and 41 are constructed so that each 2.5 millimeter of linear distance is indicated as a total change in separation of the B and B' dots of 1 millimeter. Both disk drive screws 26, and 27, have a 2.5 millimeter square thread, and each complete rotation of the screw changes the separation of the B and B' dots by 1 millimeter. The drum markings on knob 34 are graduated in units of 100 and each unit represents 0.01 millimeter of separation of the B and B' dots.

If the transparent disks are rotated toward each other the distance BB' becomes less than AA'. If the disks are rotated away from each other BB' becomes greater than AA'. To indicate this change of a greater or smaller BB' distance, two different colors are used on the millimeter and 0.01 millimeter parallax scales 40 and 41. When BB' is less than AA' the indicator is in the red part of the millimeter scale, and a number in the red series should be read on the 0.01 millimeter scale. Conversely, if BB' is greater than AA' all readings are read in the white part of the scales.

Figure 3:
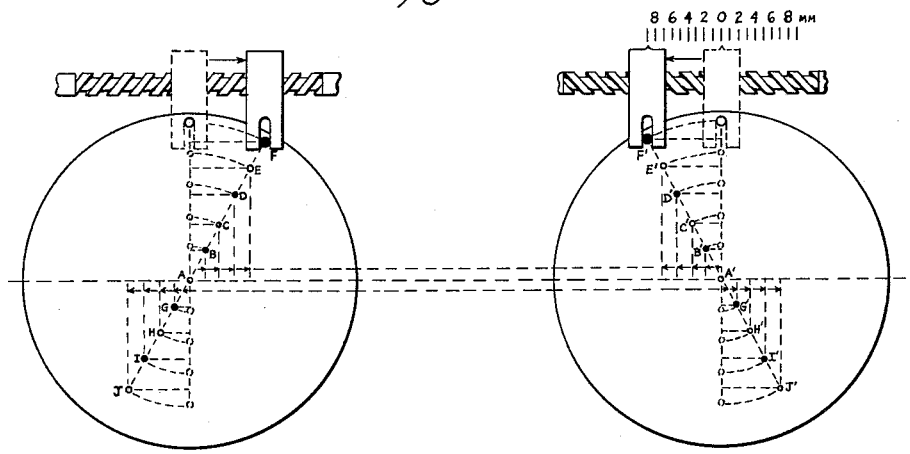

In FIG. 3 is illustrated the use of the isopachometer as an adjustable parallax ladder. After initially adjusting the separation between center dots A and A' by manipulating knob 20, to position the point A at an apparent height of a datum plane in the stereoscopic model, a further adjustment is made by turning knob 34 to determine the apparent height of the point B above or below point A. With point B moved above point A, as shown in FIG. 3, the result of the equal and opposite rotations of the disks is that the respective separations between C and C', D and D', E and E', F and F', G and G', H and H', I and I', and J and J', will all be different, and consequently will be seen at different apparent heights and depths relative to the datum point A in the stereoscopic model. As determined by the decreasing separations as compared to distance AA', points C, D, E, and F, will be seen at apparent heights increasing at equal intervals above the datum point A, and as determined by the increasing separation as compared to distance AA', points G, H, I, and J will be seen at apparent depths increasing at equal intervals below the datum point A.

Figure 4:
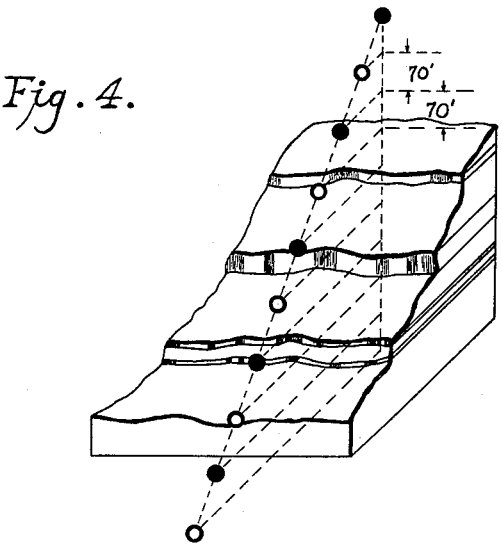
FIGS. 4 and 5 are diagrammatic views of the parallax ladder as it is related to the stereoscopic model.
Figure 5:
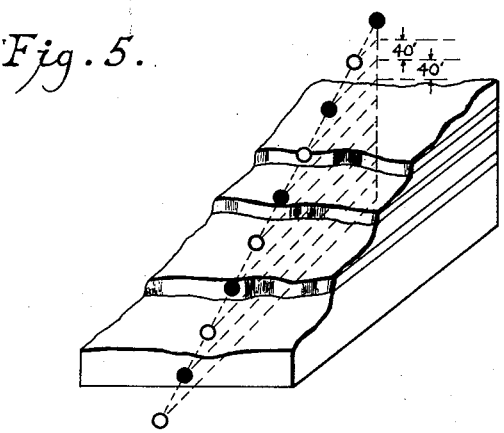

As shown in FIG. 4, the points on the parallax ladder may be seen as relating to the shape of the stereoscopic model. In this illustration the separation intervals between dots have been adjusted by turning knob 34, such that each corresponds to seventy feet of elevation. FIG. 5 shows a parallax ladder as relating to the stereoscopic model, and adjusted to effect an elevation separation interval of forty feet.

In the isopachometer disclosed herein the difference in elevation interval between any two dots viewed through the stereoscope is controlled by the parallax adjustment screws 26, 27, whereas the vertical position of this elevation interval in relation to the steresocopic terrain model or related datum, is controlled by the separation adjustment screw 16. Because the rotation of the disks determines the elevation difference or interval, and this adjustment is independent of the separation adjustment determining relative elevation, the fixed elevation interval or intervals can be moved up or down within the stereoscopic model by turning only the separation adjustment knob 20. This provides a very rapid method for checking the presence of similar elevation intervals of such features as buildings, trees, and certain geologic and physiographic features.

A further unique advantage of the multi-dot parallax ladder is that since the dots can be moved in reference to each other, their relative movement is readily apparent in the stereoscopic model. Consequently by the use of the isopachometer, measurement of elevation differences can be made more easily and accurately, and in a much shorter time.

While a preferred embodiment of the invention has been illustrated and described herein, it is to be understood that the invention is not limited thereby but is susceptible of changes in form and detail.

I claim:
1. An instrument for measuring the difference in elevation between vertical representations on a stereoscopic model comprising first and second rotatable transparent circular disks each having inscribed thereon a plurality of evenly spaced indicia defining a straight line through the center point thereof, an enclosing frame structure for said instrument comprising a pair of elongated track elements, first and second bearing means supported between said pair of elongated track elements and having slidably mounted thereon, the said first and second disks respectively, for rotation about their respective center points, a first drive means connecting the said first and second bearing means, and operable to displace one of the said bearing means along said track elements relative to the other said bearing means, first and second disk rotating means operable to rotate the respective disks in their bearing means, a slidable connecting means operably joining the said first and second disk rotating means, and a further drive means fastened to one of said disk rotating means, and operably effective to displace the latter, and simultaneously therewith through said connective means, to displace the other of said disk rotating means, relative to their respective bearing means, said first and further drive means each being separately and independently operable.

2. An instrument for measuring vertical representations on a stereoscopic model comprising two rotatable circular elements each have inscribed thereon a plurality of evenly spaced indicia defining a straight line through the center thereof, a support means comprising within a frame a first means bearing within it one of said elements for rotation, and a second means slidably maintained therein and bearing within it the other of said elements for rotation, said second bearing means being operable to move within said frame relative to the said first bearing means, a first drive means connecting said first and second bearing means and responsive to a manual manipulation to displace said second bearing means in said frame, a first and second means each being operable to rotate a respective one of the elements in its bearing means, each said element rotating means comprising a block having means engaging a pin extending from the element, and a threaded shaft on which said block rides in response to rotation of said shaft, means connecting the first and second element rotating means, a second drive means fixed to one of said element rotating means and operable to drive the latter and to simultaneously drive the other element rotating means through said means connecting the two element rotating means whereby said threaded shaft of each said element rotating means is rotated by said second drive means, said first and second drive means each being independently operable.

3. An instrument for measuring the difference in elevation between vertical representations on a stereoscopic model and comprising first and second circular transparent disks, each having inscribed thereon a plurality of evenly spaced indicia defining a straight line passing through the center point thereof, an enclosure base means embracing first and second support elements arranged in a special relationship within said base means, each support element retaining therein for relative displacement thereto, a respective one of said circular disks, means rotatably supported on said first and second support elements, for displacing the said first support element relative to said second support element, whereby predetermined spacings between each of the corresponding indicia on the two circular disks are changed a like amount, first and second drive means operable for rotatively displacing the respective circular disks in their support elements, means coupling the said first and second drive means whereby an operation of one of the drive means simultaneously drives the other, each said drive means comprising a slidable connection operatively joining said drive means to the circular disk, bearing means on each said support element retaining therein a threaded shaft operatively engaging with the slidable connection of the said support element, the threads on one of said shafts being effective when rotated to displace the slidable connection engaged therewith, in a direction opposite to that in which the threads on the other of said shafts displaces the slidable connection engaged therewith, whereby predetermined spacings between each of the corresponding indicia on the two disks are variably changed to different amounts of spacing.

4. An instrument as set forth in claim 3, wherein the means coupling said first and second drive means comprises a hollow shaft having an elongated slot therein, fixed to one of the threaded shafts, and a pin fixed to the other of said threaded shafts, being slidably retained within the said elongated slot.

5. An instrument as defined in claim 3, wherein first and second manually manipulative means are operably connected to said means rotatably supported for displacing one support element relative to the other, and to said first and second drive means, respectively, and wherein markings for an indexed numerical scale are inscribed on said first and second manipulative means, one of said drive means, said enclosure base and the said one of the support elements, whereupon there are indicated the changes of spacing between the corresponding indicia on the respective elements.

References Cited in the file of this patent

UNITED STATES PATENTS

| | | |
|---|---|---|
| 1,096,642 | Pulfrich | May 12, 1914 |
| 1,545,847 | Parsons | July 14, 1925 |
| 1,827,551 | Wulkow | Oct. 13, 1931 |
| 2,428,435 | Schlatter | Oct. 7, 1947 |
| 2,569,498 | Schlatter | Oct. 2, 1951 |
| 2,813,339 | Schlatter | Nov. 19, 1957 |
| 2,831,481 | Radin | Apr. 22, 1958 |
| 2,871,563 | Sawyer et al. | Feb. 3, 1959 |